United States Patent
Liu et al.

(10) Patent No.: US 12,533,320 B2
(45) Date of Patent: Jan. 27, 2026

(54) ORAL SUSTAINED-RELEASE COMPOSITION FOR INSOLUBLE DRUG, AND PREPARATION METHOD THEREOF

(71) Applicant: DIQI PHARMACEUTICALS CO., LTD., Guangdong (CN)

(72) Inventors: Feng Liu, Guangzhou (CN); Xiaofeng Tan, Guangzhou (CN); Wenwei Liang, Guangzhou (CN); Weijie Zhou, Guangzhou (CN); Junlong Huang, Guangzhou (CN)

(73) Assignee: DIQI PHARMACEUTICALS CO., LTD., Guangzhou (CN)

( * ) Notice: Subject to any disclaimer, the term of this patent is extended or adjusted under 35 U.S.C. 154(b) by 424 days.

(21) Appl. No.: 18/005,179

(22) PCT Filed: May 25, 2021

(86) PCT No.: PCT/CN2021/095791
§ 371 (c)(1),
(2) Date: Jan. 11, 2023

(87) PCT Pub. No.: WO2022/012172
PCT Pub. Date: Jan. 20, 2022

(65) Prior Publication Data
US 2023/0181476 A1    Jun. 15, 2023

(30) Foreign Application Priority Data

Jul. 17, 2020  (CN) .......................... 202010691708.1

(51) Int. Cl.
*A61K 9/20*     (2006.01)
*A61K 31/4035*  (2006.01)

(52) U.S. Cl.
CPC .......... *A61K 9/2077* (2013.01); *A61K 9/2009* (2013.01); *A61K 9/2013* (2013.01); *A61K 9/2027* (2013.01); *A61K 9/2054* (2013.01); *A61K 9/2095* (2013.01); *A61K 31/4035* (2013.01)

(58) Field of Classification Search
None
See application file for complete search history.

(56) References Cited

U.S. PATENT DOCUMENTS 7,488,497 B2 *  2/2009  Depui ....................... A61P 1/00
                                                        424/464

FOREIGN PATENT DOCUMENTS

WO    WO-2005039561 A1 *  5/2005  ............. A61K 31/36

* cited by examiner

*Primary Examiner* — Susan T Tran
(74) *Attorney, Agent, or Firm* — CBM PATENT CONSULTING, LLC

(57) ABSTRACT

Disclosed is an oral sustained-release composition for an insoluble drug, which is especially suitable for a low-dose insoluble drug, the oral sustained-release composition comprises a sustained-release granule part and a gel skeleton part, the sustained-release granule part comprises the insoluble drug, an enteric material, and a strong liquid sorbent, and the gel skeleton part comprises a hydrophilic gel skeleton material; and the sustained-release granules are obtained by preparing the insoluble drug and the enteric material into a suspension and then spraying the suspension onto the strong liquid sorbent, the sustained-release granules are wrapped by the gel skeleton to form a multiple sustained-release system technology, which prolongs a release time, and has a simple preparation process, high efficiency, uniform drug mixing, and less content loss.

10 Claims, 3 Drawing Sheets

ORAL SUSTAINED-RELEASE COMPOSITION FOR INSOLUBLE DRUG, AND PREPARATION METHOD THEREOF

TECHNICAL FIELD

The present invention belongs to the field of medicines, and particularly relates to an oral sustained-release composition, in particular to an oral sustained-release composition for a low-dose insoluble drug and a preparation method thereof.

BACKGROUND

In the field of pharmacy, a plurality of medicines has been developed into sustained-release and multi-stage release controlled-release preparations to achieve the purposes of stabilizing blood concentration, reducing medication times, increasing the medication compliance of patients, improving medication safety and curative effect, and reducing side effects and the like. High-activity drugs are used in the clinic with a low dose, showing good therapeutic effects, but sometimes also bring toxic or side effects due to the level and fluctuation of the blood concentration. Therefore, a large proportion of low-dose high-activity drugs need to be developed into sustained-release and controlled-release preparations. At present, the most mature oral sustained-release technologies comprise skeleton sustained-release, membrane-controlled sustained-release and osmotic pump controlled-release, and the like, but these technologies are still difficult to meet the development of sustained-release preparations for some insoluble drugs, and the main problems mainly comprise complicated process preparation and high cost, and further comprise poor control of release speed and degree, insufficient release, and other aspects.

In Oral Controlled Release Formulation Design and Drug Delivery (Hong Wen), it is mentioned that food takes about 3 hours to 7 hours from mouth to cecum, in which a stomach pH is about 1 to 5, a duodenum pH is about 5 to 7, and the transit will last for 10 hours to 24 hours in a colon stage, while the average pH of the colon is about 6.8. The colon has a relatively high pH value and a long residence time, which provides an important window for drug absorption.

The combination of slow release and targeted release technologies can achieve sustained drug release. CN107405311 discloses a sustained-release preparation for an insoluble drug formed by the combination of a matrix sustained-release tablet I and a coated targeted-release tablet II. This combination needs to prepare the two tablets separately, and the combination is realized by filling capsules, which leads to high complexity in the industrialization of the preparation. CN103442698 provides a controlled-release gastric retention system, which can achieve a large degree of retention in the stomach to form a sustained-release effect through different combinations, and provides more solutions for the sustained-release development of insoluble drugs.

Common colon targeting technologies comprise coating and skeleton of enteric materials, wherein preparing microspheres or granules from the enteric materials and drugs by solvent evaporation and hot melt extrusion is a common preparation method of an enteric material skeleton. Fahima M. Hashem et al. reported In Vitro and *In Vivo Evaluation of Combined Time and pH-Dependent Oral Colonic Targeted Prednisolone Microspheres* that Eudradit®S 100, ethyl cellulose, and medicaments were formulated into a methanol solution and then dispersed in paraffin, then emulsifier Span® 80 was used to form tiny microspheres, which were then eluted and dried to obtain prednisolone microsphere preparation, which could position the colon and administer prednisolone.

Kiran Prakash Sawant et al. disclosed in *Extended release delivery system of metoprolol succinate using hot-melt extrusion: effect of release modifier on methacrylic acid copolymer* that Eudragit® S100 and Eudragit® L100 were combined with a certain amount of release modifiers Polyox™ WSR 303 and Eudragit® L100-55 to make a sustained-release formulation of metoprolol succinate by using the hot melt extrusion (HME) technology.

It is a preferable prescription process to prepare sustained-release or targeted release preparation by enteric materials and bulk drugs, or further adding other release-adjusting materials. However, the preparation process of skeleton microspheres by solvent evaporation is complicated, the preparation conditions are harsh, and the quality controllability is poor. Hot melt extrusion granulation requires special equipment for hot melt extrusion, and the production efficiency of this process is low, which is not conducive to large-scale industrialization.

CN1204895 discloses a pharmaceutical composition containing etoposide, which comprises: using an enteric material as a solid dispersion carrier, dissolving and dispersing active pharmaceutical ingredients (API) in the carrier with an organic solvent, drying and pulverizing, and then mixing the solid dispersion with a skeleton type sustained (controlled)-release material, granulating, tableting, and enteric-coating to obtain a sustained-release preparation. However, the content of the method described in this patent is suitable for compounds with high solubility similar to etoposide. A large part of insoluble drugs need to be dissolved by using a large number of organic solvents, and the subsequent drying will also bring the problem of too long preparation time. Moreover, the preparation method of the solid dispersion is difficult in industrialization and low in efficiency.

Some patients who take drugs for chronic diseases and tumors, such as low-dose immunomodulators comprising apremilast, lenalidomide and tofacitinib, and anticoagulants such as apixaban, or the like, take drugs for a long time and may take the drugs many times a day. The sustained-release preparations will help control the blood concentration, reduce side effects and reduce the number of daily doses. Therefore, it is necessary to develop an oral sustained-release composition suitable for low-dose insoluble drugs and a preparation method thereof.

In the research process, the inventor finds that the problems of too fast dissolution or incomplete final dissolution are easy to occur by adopting the physical mixing of the insoluble drug and the sustained-release material or further granulating and then tableting, and a satisfactory development and prescription process of the sustained-release preparation cannot be obtained. The inventor subsequently finds that preparing a suspension by using an enteric material and a slightly soluble compound with small particle size can effectively disperse the API, which not only can effectively control the dissolution rate of the drug in a low pH value solution, but also can fully dissolve the drug in a high pH value solution, and this property can be well used for developing the sustained-release preparation for the insoluble drugs.

SUMMARY

Object of the invention: the present invention provides an oral sustained-release composition for a low-dose insoluble drug and a preparation method thereof. Sustained-release granules containing an enteric material can be quickly prepared by spraying a drug-containing suspension onto a strong liquid sorbent, to improve drug content uniformity. The preparation process uses less solvent and has high production efficiency. Combined with a hydrophilic gel skeleton material, multiple sustained-release effects are formed, and a continuous sustained-release effect is achieved.

Technical solutions: the oral sustained-release composition provided by the present invention consists of a sustained-release granule part and a gel skeleton part, wherein the gel skeleton wraps the sustained-release granules to form a dual sustained-release system, wherein the sustained-release granules contain the insoluble drug, an enteric material and a strong liquid sorbent, and the gel skeleton part contains a hydrophilic gel skeleton material. The sustained-release granules are obtained by preparing the insoluble drug and a liquid substance containing the enteric material into a drug-containing suspension and then spraying the suspension onto the strong liquid sorbent.

The insoluble drug in the oral sustained-release composition according to the present invention accounts for 2%-15% of a weight of the sustained-release granules, a weight ratio of the insoluble drug to the enteric material is 1:2 to 1:4, and the strong liquid sorbent accounts for 35%-75% of the weight of the sustained-release granules; the sustained-release granules account for 40%-70% of a weight of the oral sustained-release composition; and a dose of the hydrophilic gel skeleton material account for 20%-50% of the weight of the oral sustained-release composition.

The insoluble drug according to the present invention is present in the oral sustained-release composition at a weight ratio of less than 10%.

The low-dose insoluble drug according to the present invention comprises apremilast, lenalidomide, tofacitinib and apixaban.

d90 in particle size distribution of the insoluble drug is controlled to be less than 20 microns; preferably, the d90 is less than 10 microns; and most preferably, the d90 is less than 5 microns. The smaller the particle size of the insoluble drug is, the easier the insoluble drug is to be wrapped by the enteric material to form sustained-release, and the more conducive to the later dissolution.

The enteric material according to the present invention refers to a polymer material soluble in a pH range of 6-8, which can ensure that the drug coated by the enteric material is capable of being completely released in the colon. The enteric material comprises any one of a copolymer of methacrylic acid and methyl methacrylate (a molar ratio scope of the methacrylic acid to the methyl methacrylate is 1:0.5 to 1:2), and a copolymer of methacrylic acid, methyl acrylate and methyl methacrylate (1:1:1); the frequently-used enteric material comprises a copolymer of methacrylic acid and methyl methacrylate (1:2), a copolymer of methacrylic acid and methyl methacrylate (1:1), and the copolymer of methacrylic acid, methyl acrylate and methyl methacrylate (1:1:1); and preferably the copolymer of methacrylic acid and methyl methacrylate (1:1), and the copolymer of methacrylic acid, methyl acrylate, and methyl methacrylate. In commercial enteric material products, the copolymer of methacrylic acid and methyl methacrylate (1:2) refers to acrylic resin 2#, Eudragit L100, or the like; the copolymer of methacrylic acid and methyl methacrylate (1:1) refers to acrylic resin 3#, Eudragit S100 or the like; and the copolymer of methacrylic acid, methyl acrylate and methyl methacrylate (1:1:1) refers to Eudragit FS 30D, or the like. The enteric material in the sustained-release granules according to the present invention is added in a liquid form. The liquid substance containing the enteric material is an aqueous dispersion form or an organic solvent solution form. The aqueous dispersion of the enteric material may be self-prepared, and commercial products are also available. Some embodiments comprise commercial products such as Utrecht FS 30D, or the like. The organic solvent solution of the enteric material is obtained by dissolving the enteric material with an organic solvent.

In addition to the enteric material and water, it is necessary to add an alkaline substance during the process of preparing the aqueous dispersion of the enteric material. The alkaline substance comprises aqueous ammonia, sodium hydroxide and potassium hydroxide. The organic solvent solution of the enteric material may be obtained by dissolving the enteric material with acetone, ethanol, carbon tetrachloride and isopropanol.

Before use, the liquid substance of the enteric material may also be added with anti-sticking agent, plasticizer, surfactant, and the like. The anti-sticking agent comprises colloidal silicon dioxide, talcum powder and glyceryl monostearate (GMS); the plasticizing agent comprises glyceryl monostearate (GMS), triethyl citrate (TEC) and polyethylene glycol; and the surfactant comprises sorbitan fatty acid (Span), polysorbate (Tween) and sodium dodecyl sulfate.

The insoluble drug in the present invention may be dispersed into the liquid substance containing the enteric material by stirring, high-shear homogenizing, high-speed vortex, ultrasonic dispersion and other ways to obtain the drug-containing suspension, or the insoluble drug may be mixed and dispersed with a solvent in advance and then added into the liquid substance containing the enteric material for uniform mixing to obtain the drug-containing suspension.

A solid content in the drug-containing suspension is 10-35%, and preferably 15-25%.

The strong liquid sorbent in the present invention is a substance that is insoluble in water but has a large adsorbing capacity, which can meet the requirement of timely adsorbing excess solvent in the rapid spraying process of the drug-containing suspension, and reduce the phenomena of fast and excessive granule growth and uneven granulation caused by excessive humidity, so as to quickly and smoothly realize the process of granulating the enteric material liquid into the sustained-release granules.

The strong liquid sorbent comprises microcrystalline cellulose, croscarmellose sodium, croscarmellose, polyvinylpolypyrrolidone, sodium carboxymethyl starch, low substituted hydroxypropyl cellulose, starch and pregelatinized starch, and preferably microcrystalline cellulose, croscarmellose sodium, polyvinylpolypyrrolidone, sodium carboxymethyl starch and low substituted hydroxypropyl cellulose.

The sustained-release granules according to the present invention may also be added with 0-5% of an adhesive by weight of the sustained-release granules, so as to obtain the sustained-release granules with better granulation effect. The adhesive comprises any one or several of polyvinylpyrrolidone, hydroxypropyl methylcellulose, hydroxypropyl cellulose, carboxymethyl cellulose, carrageenin, alginic acid, arabic gum, pectin, xanthan gum and tragacanth.

Before use, the liquid substance containing the enteric material may be optionally added with any one or a combination of several of 0-8% of anti-sticking agent, 0-8% of plasticizer and 0-3% of surfactant by weight of the sustained-release granules before use, wherein the anti-sticking agent is selected from colloidal silicon dioxide, talcum powder and glyceryl monostearate; the plasticizer is selected from glyceryl monostearate, triethyl citrate and polyethylene glycol; and the surfactant is selected from sorbitan fatty acid, polysorbate, and sodium dodecyl sulfate.

The sustained-release granules according to the present invention may be added into components of the gel skeleton part for granulation together, or the gel skeleton part may also be granulated separately, and then mixed with the prepared sustained-release granules, or the sustained-release granules may be directly mixed with the components of the gel skeleton part.

The oral sustained-release composition according to the present invention, wherein the gel skeleton part contains the hydrophilic gel skeleton material, and may also contain other pharmaceutical adjuvants, comprising a filler, an adhesive, a glidant and a lubricant.

The hydrophilic gel skeleton material comprises arabic gum, tragacanth gum, polyvinyl pyrrolidone (PVP or polyvidone), hydroxypropyl methyl cellulose (HPMC), shellac, hydroxypropyl cellulose (HPC), hydroxethyl cellulose (HEC), alginate, methylated cellulose (MC), carrageenin, carboxymethyl cellulose and sodium salt, carbomer, and polyvinyl alcohol (PVA) and the like.

The hydrophilic gel material in the present invention can realize rapid hydration to form a gel coat, and achieve the purpose of controlling a dissolution rate in an early stage. By adjusting the category and dose of the hydrophilic gel skeleton, a tablet can be corroded in a certain time, and the sustained-release granule part may leave the tablet in the corrosion process, forming an independent sustained-release unit.

A dose of the hydrophilic gel skeleton material in the present invention accounts for 20%-50% of the weight of the preparation, and preferably, 20%-40%. When the dose of the hydrophilic gel skeleton material exceeds about 50%, a change range of the sustained-release effect thereof decreases significantly, but the material cost increases.

The gel skeleton part may be optionally added with a filler, an adhesive, a lubricant and a glidant.

The filler in the gel skeleton part according to the present invention comprises, but is not limited to any one or two of cellulose derivatives and starch derivatives, such as comprising lactose, mannitol, xylitol, fructose, sucrose, dextrin, microcrystalline cellulose, pregelatinized starch, sodium carboxymethyl starch, methylated cellulose, hydroxypropyl starch, and the like; and more preferably one or more of lactose, mannitol, dextrin, microcrystalline cellulose and pregelatinized starch. The dose of the hydrophilic gel skeleton material in the present invention accounts for 0%-35% of the weight of the preparation.

A main function of the filler is to improve compressibility, fluidity, granule formation and other effects. The dose of the filler may be adjusted according to the needs of a target product, and plays a certain auxiliary role.

The adhesive comprises, but is not limited to polyvinylpyrrolidone, starch slurry, hydroxypropyl methylcellulose, hydroxypropyl cellulose, carboxymethyl cellulose, dextrin, carrageenin, alginic acid, arabic gum, pectin, xanthan gum and tragacanth. The main function of the adhesive is to quickly granulate and improve compressibility. A dose of the adhesive in the present invention accounts for 0%-10% of the total weight of the oral sustained-release composition.

The lubricant comprises, but is not limited to magnesium stearate, calcium stearate, sodium stearate, stearic acid, sodium stearyl fumarate, talcum powder, glyceryl behenate, hydrogenated vegetable oil and stearyl alcohol. A dose of the lubricant in the present invention accounts for 0%-5% of the total weight of the oral sustained-release composition.

The glidant comprises but is not limited to talcum powder, colloidal silicon dioxide, silicon dioxide, sodium lauryl sulfate, stearic acid and metal salt thereof. A dose of the glidant in the present invention accounts for 0%-5% of the total weight of the oral sustained-release composition.

In a preferred embodiment, the oral sustained-release composition comprises the sustained-release granule part and the gel skeleton part, wherein the sustained-release granule part comprises apremilast, the enteric material and the strong liquid sorbent, and the gel skeleton part comprises the hydrophilic gel skeleton material; wherein the enteric material refers to Eudragit S100, and Eudragit FS 30D; the strong liquid sorbent comprises microcrystalline cellulose, croscarmellose sodium, croscarmellose, polyvinylpolypyrrolidone, sodium carboxymethyl starch and low substituted hydroxypropyl cellulose; and the hydrophilic gel skeleton material comprises arabic gum, tragacanth gum, polyvinyl pyrrolidone (PVP or polyvidone), hydroxypropyl methyl cellulose (HPMC), shellac, hydroxypropyl cellulose (HPC), alginate, methylated cellulose (MC), carrageenin, carboxymethyl cellulose and sodium salt, carbomer, and polyvinyl alcohol (PVA); wherein, a weight ratio of the apremilast to the enteric material is 1:2 to 1:4; and the sustained-release granules are obtained by preparing the insoluble drug and the enteric material into a suspension and then spraying the suspension onto the strong liquid sorbent.

The oral sustained-release composition provided by the present invention is obtained by dispersing the insoluble drug in the liquid substance containing the enteric material to obtain the suspension, and then spraying the obtained suspension onto the strong liquid sorbent to form the sustained-release granule part, and then combining the sustained-release granule part with the material of the gel skeleton part for processing to obtain blended granules, and tableting the granules.

The sustained-release granules in the oral sustained-release composition provided by the present invention may be obtained by wet-granulating process, such as high-shear granulating, fluidized bed granulating and side-spray granulating; and the gel skeleton part may be obtained by direct powder mixing, w wet-granulating process and dry-granulating process.

In the preparation process of the oral sustained-release composition provided by the present invention, the prepared sustained-release granules may be added into the components of the gel skeleton part for granulation together, or the gel skeleton part may be granulated separately and then mixed with the prepared sustained-release granules for subsequent tableting.

In the oral sustained-release composition provided by the present invention, the sustained-release granule part is wrapped by the gel skeleton to form a multiple sustained-release systems. The sustained-release granules in the present invention can form three dissolution and release effects of quick release, sustained release and targeted and controlled release, wherein a part of API not wrapped by the enteric material shows the quick release effect, while a part of holes may be formed during the rapid granulation and drying process, so that the enteric material skeleton shows the sustained release effect in an acidic medium, while a part of the completely wrapped bulk drug shows the enteric targeted and released effect, and the quick-release part of the sustained-release granules can effectively form sustained release because an outer layer thereof is wrapped by the gel skeleton. Moreover, the gel sustained-release layer can effectively resist high-pH environments in the duodenum, jejunum, ileum and other positions, ensuring that a part of the effective ingredients completely wrapped by the enteric material reach the cecum and colon and then release completely, thus forming a stable and effective targeted release effect.

A dissolution rate of the sustained-release granules in the acidic medium may be used for evaluating and detecting a degree of encapsulation of API by the enteric material and a degree of controlling the drug release. With reference to the second method in the general principle (volume IV) <0931> of the Pharmacopoeia of the People's Republic of China (2015 version), at a rotating speed of 75 rpm, the dissolution rate of the sustained-release granules was determined by using a hydrochloric acid solution of sodium chloride (pH1.2) with a volume of 900 ml as a release medium and a temperature of 37° C.±0.5° C. A dissolution rate in 120 minutes is called an acid dissolution rate.

A target control range of an acid solubility of the sustained-release granules in the present invention is 33%-80%; and preferably, the control range is 50%-80%.

Refer to the content uniformity detection method in the general principle (volume IV) <0941> of the Pharmacopoeia of the People's Republic of China (2020 version) for the content uniformity detection of the oral sustained-release composition of the present invention. 10 sustained-release tablets are taken, a relative content $x_i$ of each single dose with a labeled amount of 100 is determined, a mean value and a standard deviation S and an absolute value A of a difference between the labeled amount and the mean value are calculated, and then A+2.2S is calculated. When A+2.2S is less than 15, it can be considered that the content uniformity is qualified.

The oral sustained-release composition of the present invention may be continuously released for 24 hours, wherein the dissolution rate is no more than 30% in 2 hours, 50%-80% in 12 hours and more than 80% in 20 hours.

The dissolution rate of the oral sustained-release composition according to the present invention is detected at a rotating speed of 75 rpm and a temperature of 37° C.±0.5° C. with reference to the second method in the general principle (volume IV) <0931> of the Pharmacopoeia of the People's Republic of China (2020 version). Six unit doses of samples are tested in parallel. A hydrochloric acid solution of sodium chloride (pH 1.2) with a volume of 750 ml is used as a release medium. After 120 minutes, the dissolution rate is tested. 150 mL of 0.3 mol/L sodium phosphate solution with a temperature of 37° C.±0.5° C. is added to the above acid solution to continue the operation for 10 hours. Then 100 mL of 0.5 mol/L sodium phosphate solution with a temperature of 37° C.±0.5° C. is added into the above acid solution (if necessary, the pH value is adjusted to 7.8 with 2 mol/L hydrochloric acid solution or 2 mol/L sodium hydroxide solution), or according to the time specified under each variety, an appropriate amount of dissolved solution is sucked at a specified sampling point, and filtered, which is completed within 30 seconds from sampling to filtration. According to the method specified under each variety, the dissolution rate of each tablet (granule) in a buffer solution is calculated.

Beneficial effects: compared with the prior art, the present invention discloses a technology of wrapping the sustained-release granule part by the gel skeleton to form the double sustained-release system, and the prepared oral sustained-release composition for the low-dose insoluble drug has the following advantages:
  (1) the preparation process is simple, the use of solvents is small, and the efficiency is high: API and the enteric material are dispersed into the suspension substance together, so that the drug loading amount is increased, the amount of solvents is reduced, and the materials with large liquid adsorbing capacity are used as carriers to realize rapid spray-granulating and drying, so as to obtain the sustained-release granules;
  (2) API is added into other materials in a form of suspension spray, and evenly dispersed, so as to reduce the risk of mixing uniformity and ensure the content uniformity of the drug; and
  (3) the multiple sustained-release system prolong the release time and realizes complete dissolution: the sustained-release granules in the present invention can form three dissolution and release effects of quick release, sustained release and targeted and controlled release, and the multi-layer release of the sustained-release granules combined with the sustained-release effect of the gel skeleton can effectively prolong the release time and realize complete dissolution in intestinal tracts. The sustained-release granules in the invention can form three dissolution and release effects of quick release, sustained release and positioning and controlled release, and the multi-layer release of the sustained-release granules combined with the sustained-release effect of gel skeleton can effectively prolong the release time and completely dissolve in the intestinal tract.

DETAILED DESCRIPTION

Figure 1:
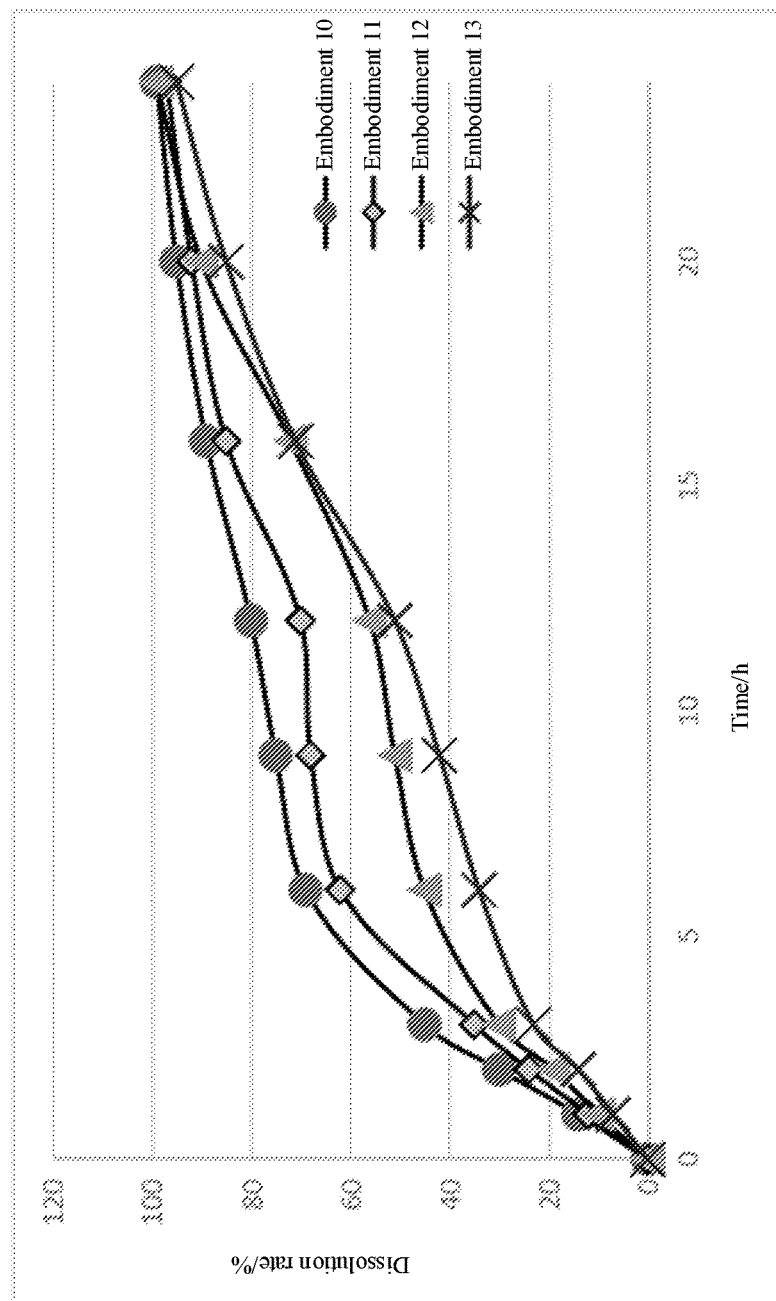
FIG. 1 shows dissolution curves of Embodiment 10 to 13.

The present invention will be further described in detail below with reference to the embodiments.

Embodiments 1 to 4

The formula and dose ratio used in Embodiments 1 to 4 were shown in Table 1 below, and the total weight of materials in each batch was 500 g (excluding the weight of solvents).

TABLE 1

| | | Embodiment 1 | | Embodiment 2 | |
| --- | --- | --- | --- | --- | --- |
| | Material | Parts by weight | Percentage | Parts by weight | Percentage |
| API | Apremilast (d90: 3.3 microns) | 30 | 9.84% | 30 | 9.12% |
| Enteric material | Eudragit S100 | 60 | 19.67% | 75 | 22.80% |
| Anti-sticking agent | Talcum powder | — | — | 12 | 3.65% |
| Plasticizer | Triethyl citrate | — | — | 12 | 3.65% |
| Solvent | Ethanol (95%)* | 800 | — | 700 | — |
| Strong liquid sorbent | Microcrystalline cellulose | 215 | 70.49% | 200 | 60.79% |
| | Total | 305 | | 329 | |
| | Acid dissolution rate | 79% | | 73% | |

TABLE 1-continued

|  | Material | Embodiment 3 | | Embodiment 4 | |
|---|---|---|---|---|---|
|  |  | Parts by weight | Percentage | Parts by weight | Percentage |
| API | Apremilast (d90: 3.3 microns) | 30 | 8.50% | 30 | 7.61% |
| Enteric material | Eudragit S100 | 90 | 25.50% | 120 | 30.46% |
| Anti-sticking agent | Talcum powder | 18 | 5.10% | 24 | 6.09% |
| Plasticizer | Triethyl citrate | 15 | 4.25% | 20 | 5.08% |
| Solvent | Ethanol (95%)* | 600 | — | 500 | — |
| Strong liquid sorbent | Microcrystalline cellulose | 200 | 56.66% | 200 | 50.76% |
|  | Total | 353 |  | 394 |  |
|  | Acid dissolution rate | 55% |  | 42% |  |

The solvent was dried and removed during processing.

Preparation process steps of Embodiments 1 to 4:

1) dissolving Utech S100 in an appropriate amount of ethanol (95%); and adding apremilast, talcum powder and triethyl citrate into an appropriate amount of ethanol (95%), homogenizing the mixture for about 10 minutes by a homogenizer, then pouring the mixture into Utech S100 solution, and continuously stirring the suspension by a stirrer during granulation;
2) spraying the suspension in the step 1) into microcrystalline cellulose by WBF-2G fluidized bed top-spray granulation, and controlling an atomization pressure at 0.5-2.0 bar (increasing 0.5 bar every 10 minutes until the maximum value) and a spray rate at 5-15 g/min (increasing 5 g/min every 10 minutes until the maximum value), an air volume at 90 m$^3$/h and air inlet temperature at 45° C. during the process; after spraying the suspension, drying at 50-60° C. for 20 minutes to remove the residual solvent and obtain dried granules; and
3) dry-grading the dried granules obtained in step 2) by a sieve with a pore diameter of 40 meshes to obtain sustained-release granules.

Samples were taken to detect acid dissolution rates of the sustained-release granules, and each sample contained about 60 mg of apremilast.

Embodiments 5 to 8

The formula and dose ratio used in Embodiments 5 to 8 were shown in Table 2 below, wherein d90 in particle size distribution of API apremilast was 7.4 microns, and the total weight of materials in each batch was 500 g (excluding the weight of solvents).

TABLE 2

|  |  | Embodiment 5 | | | Embodiment 6 | | |
|---|---|---|---|---|---|---|---|
|  | Material | Parts by weight | Percentage | Material | Parts by weight | Percentage |  |
| API | Apremilast | 60 | 11.88% | Apremilast | 60 | 9.51% |  |
| Enteric material | Eudragit FS 30D* | 120 | 23.76% | Eudragit FS 30D* | 180 | 28.53% |  |
| Anti-sticking agent | Talcum powder | 6 | 1.19% | Talcum powder | 10 | 1.58% |  |
| Plasticizer | Triethyl citrate | 6 | 1.19% | Polyethylene glycol 4000 | 18 | 2.85% |  |
| Surfactant | Tween 80 | 3 | 0.59% | Tween 80 | 3 | 0.48% |  |
| Solvent | Purified water** | Appropriate | — | Purified water** | Appropriate | — |  |
| Adhesive | Hydroxypropyl methylcellulose E3 | 10 | 1.98% | Polyvidone k30 | 10 | 1.58% |  |
| Strong liquid sorbent | Microcrystalline cellulose | 300 | 59.41% | Sodium carboxymethyl starch | 350 | 55.47% |  |
|  | Total | 505 |  | Total | 631 |  |  |
|  | Acid dissolution rate | 78% |  | Acid dissolution rate | 69% |  |  |
|  |  | Embodiment 7 | | | Embodiment 8 | | |
|  | Material | Parts by weight | Percentage | Material | Parts by weight | Percentage |  |
| API | Apremilast | 60 | 8.88% | Apremilast | 60 | 9.38% |  |
| Enteric material | Eudragit FS 30D* | 224 | 33.14% | Eudragit FS 30D* | 286 | 44.69% |  |
| Anti-sticking agent | Talcum powder | 16 | 2.37% | Talcum powder | 26 | 4.06% |  |
| Plasticizer | Triethyl citrate | 16 | 2.37% | — | — | — |  |
| Solvent | Purified water** | Appropriate | — | Purified water** | Appropriate | — |  |
| Adhesive | Sodium carboxymethylcellulose | 10 | 1.48% | Hydroxypropyl cellulose | 18 | 2.81% |  |

TABLE 2-continued

| | | | | | | |
|---|---|---|---|---|---|---|
| Strong liquid sorbent | Starch | 350 | 51.78% | Croscarmellose | 250 | 39.06% |
| | Total | 676 | | Total | 640 | |
| | Acid dissolution rate | 60% | | Acid dissolution rate | 45% | |

Based on the weight of solid matters in Utrecht aqueous dispersion.

**The dose of the purified water comprised the amount of water in Utrecht aqueous dispersion and the added amount of water. The purified water was dried and removed during processing. In the prescription, other components except the strong liquid sorbent and the adhesive were mixed with the solvent to prepare the suspension, and the dose of the solvent used was about 20%-25% of the solid contents in the suspension.

Preparation process steps of Embodiments 5 to 8:
1) adding an anti-sticking agent, a plasticizer, a surfactant and an API into a certain amount of solvent hot water (70° C. to 80° C.), homogenizing the mixture for 10 minutes with a high-shear homogenizer to obtain a suspension, and continuously stirring the suspension for later use;
2) spraying the suspension in step 1) into microcrystalline cellulose by WBF-2G fluidized bed top-spray granulation, and controlling an atomization pressure at 0.5-2.0 bar (increasing 0.5 bar every 10 minutes until the maximum value) and a spray rate at 5-15 g/min (increasing 5 g/min every 10 minutes until the maximum value), an air volume at 90 m³/h and air inlet temperature at 45° C. during the process; after spraying the suspension, drying at 50-60° C. for 20 minutes to remove the residual solvent and obtain dried granules; and
3) dry-grading the dried granules obtained in step 2) by a sieve with a pore diameter of 30 meshes to obtain sustained-release granules.

Samples were taken to detect acid dissolution rates of the sustained-release granules, and each sample contained about 60 mg of apremilast.

Embodiment 9

The formula and dose ratio used in Embodiment 9 were shown in Table 3 below, wherein d90 in particle size distribution of API apremilast was 15 microns, and the total weight of materials in each batch was 500 g (excluding the weight of solvents).

TABLE 3

| | Embodiment 9 | | |
|---|---|---|---|
| | Material | Parts by weight | Percentage |
| API | Apremilast | 30 | 6.31% |
| Enteric material | Eudragit L100 | 120 | 25.23% |
| Alkaline substance | Sodium hydroxide | 1.6 | 0.34% |
| Anti-sticking agent | Talcum powder | 9 | 1.89% |

TABLE 3-continued

| | Embodiment 9 | | |
|---|---|---|---|
| | Material | Parts by weight | Percentage |
| Plasticizer | Triethyl citrate | 10 | 2.10% |
| Solvent | Purified water* | 500 | — |
| Adhesive | Hydroxypropyl methylcellulose E5 | 5 | 1.05% |
| Strong liquid sorbent | Low substituted hydroxypropyl cellulose | 300 | 63.08% |
| | Total Acid dissolution rate | 475.6 68% | |

In the prescription, other components except the strong liquid sorbent and the adhesive were mixed with the solvent to prepare the suspension. A dose of the solvent used was 25.4% of the solid content in the suspension, and purified water was dried and removed during processing.

Preparation process steps of Embodiment 9:
1) slowly pouring an enteric material Utrecht L100 into water and stirring for 5-10 minutes; after the enteric material was completely wetted, slowly adding sodium hydroxide powder or solution and keep stirring, and finally keep stirring for 30 minutes; and then, adding a bulk drug, a plasticizer and an anti-sticking agent, continuously stirring the mixture uniformly, filtering with a 40-mesh sieve to obtain a suspension, and keeping stirring the suspension for later use;
2) spraying the suspension in step 1) into microcrystalline cellulose by WBF-2G fluidized bed top-spray granulation, and controlling an atomization pressure at 0.5-2.0 bar (increasing 0.5 bar every 10 minutes until the maximum value) and a spray rate at 5-15 g/min (increasing 5 g/min every 10 minutes until the maximum value), an air volume at 90 m3/h and air inlet temperature at 45° C. during the process; after spraying the suspension, drying at 50-60° C. for 20 minutes to remove the residual solvent and obtain dried granules; and
3) dry-grading the dried granules obtained in step 2) by a sieve with a pore diameter of 20 meshes to obtain sustained-release granules.

Samples were taken to detect acid dissolution rates of the sustained-release granules, and each sample contained about 60 mg of apremilast.

Embodiments 10 to 13

The formula and dose ratio used in Embodiments 10 to 13 were shown in Table 4 below, and the total weight of blended granules in each batch was 400 g.

TABLE 4

|  | Material | Embodiment 10 | | Embodiment 11 | |
| --- | --- | --- | --- | --- | --- |
|  |  | Parts by weight | Percentage | Parts by weight | Percentage |
|  | Source of sustained-release granules | Embodiment 1 | — | Embodiment 2 | — |
|  | Sustained-release granules | 305 | 69.32% | 329 | 67.98% |
| Hydrophilic gel material | Hydroxypropyl methylcellulose K15M PH DC | 130 | 29.55% | 150 | 30.99% |
| Lubricant | Magnesium stearate | 5 | 1.14% | 5 | 1.03% |
|  | Tablet weight mg | 440 | | 484 | |
|  | Specification mg | 60 | | 60 | |
|  | Content uniformity A + 2.2 S | 7.2 | | 8.6 | |

|  | Material | Embodiment 12 | | Embodiment 13 | |
| --- | --- | --- | --- | --- | --- |
|  |  | Parts by weight | Percentage | Parts by weight | Percentage |
|  | Source of sustained-release granules | Embodiment 3 | — | Embodiment 4 | — |
|  | Sustained-release granules | 353 | 67.88% | 394 | 67.81% |
| Hydrophilic gel material | Hydroxypropyl methylcellulose K15M PH DC | 160 | 30.77% | 180 | 30.98% |
| Lubricant | Magnesium stearate | 7 | 1.35% | 7 | 1.20% |
|  | Tablet weight mg | 520 | | 581 | |
|  | Specification mg | 60 | | 60 | |
|  | Content uniformity A + 2.2 S | 6.2 | | 5.1 | |

Preparation process steps of Embodiments 10 to 13:
1) mixing sustained-release granules with a hydrophilic gel material and a lubricant for 10 minutes to obtain blended granules; and
2) pouring the blended granules into a tablet press, selecting a round die with a diameter of Φ11 mm, and pressing according to a target tablet weight to obtain sustained-release tablets.

Dissolution situations of the tablets prepared in Embodiments 10 to 13 were shown in Table 5 below, and the dissolution curves were shown in FIG. 1.

TABLE 5

| | Dissolution rate (%) | | | | | | | | | |
| --- | --- | --- | --- | --- | --- | --- | --- | --- | --- | --- |
| Time/hour | 0 | 1 | 2 | 3 | 6 | 9 | 12 | 16 | 20 | 24 |
| Embodiment 10 | 0 | 14 | 30 | 45 | 69 | 75 | 80 | 89 | 95 | 99 |
| Embodiment 10 11 | 0 | 12 | 24 | 35 | 62 | 68 | 70 | 85 | 92 | 97 |

TABLE 5-continued

| | Dissolution rate (%) | | | | | | | | | |
| --- | --- | --- | --- | --- | --- | --- | --- | --- | --- | --- |
| Time/hour | 0 | 1 | 2 | 3 | 6 | 9 | 12 | 16 | 20 | 24 |
| Embodiment 10 12 | 0 | 10 | 19 | 30 | 45 | 51 | 56 | 72 | 90 | 99 |
| Embodiment 10 13 | 0 | 7 | 14 | 23 | 34 | 42 | 51 | 71 | 85 | 95 |

Embodiments 14 to 17

The formula and dose ratio used in Embodiments 14 to 17 were shown in Table 5 below, and the total weight of blended granules in each batch was 400 g.

TABLE 6

|  | Material | Embodiment 14 Parts by weight | Embodiment 14 Percentage | Embodiment 15 Parts by weight | Embodiment 15 Percentage |
|---|---|---|---|---|---|
|  | Source of sustained-release granules | Embodiment 5 |  | Embodiment 6 |  |
|  | Sustained-release granules | 505 | 49.61% | 631 | 58.64% |
| Hydrophilic gel material | Hydroxypropyl methylcellulose K4M PH DC | 500 | 49.12% | — | — |
| Hydrophilic gel material | Hydroxypropyl methylcellulose K15M PH DC | — | — | 400 | 37.17% |
| Filler | Lactose | 10 | 0.98% | 40 | 3.72% |
| Lubricant | Magnesium stearate | 3 | 0.29% | 5 | 0.46% |
|  | Tablet weight mg | 1018 |  | 1076 |  |
|  | Specification mg | 60 |  | 60 |  |
|  | Content uniformity A + 2.2 S | 7.8 |  | 5.6 |  |

|  | Material | Embodiment 16 Parts by weight | Embodiment 16 Percentage | Embodiment 17 Parts by weight | Embodiment 17 Percentage |
|---|---|---|---|---|---|
|  | Source of sustained-release granules | Embodiment 7 |  | Embodiment 8 |  |
|  | Sustained-release granules | 676 | 66.08% | 640 | 69.04% |
| Hydrophilic gel material | Hydroxypropyl methylcellulose K100M PH DC | 300 | 29.33% | — | — |
| Hydrophilic gel material | Hydroxypropyl cellulose MXF | — | — | 240 | 25.89% |
| Filler | Lactose | 40 | 3.91% | 40 | 4.31% |
| Lubricant | Magnesium stearate | 7 | 0.68% | 7 | 0.76% |
|  | Tablet weight mg | 1023 |  | 927 |  |
|  | Specification mg | 60 |  | 60 |  |
|  | Content uniformity A + 2.2 S | 6.6 |  | 5.3 |  |

Preparation process steps of Embodiments 14 to 17:

1) mixing sustained-release granules with a hydrophilic gel material and a lubricant for 10 minutes to obtain blended granules; and 2) pouring the blended granules into a tablet press, selecting a capsule type die to perform tableting according to a target tablet weight to obtain sustained-release tablets.

Figure 2:
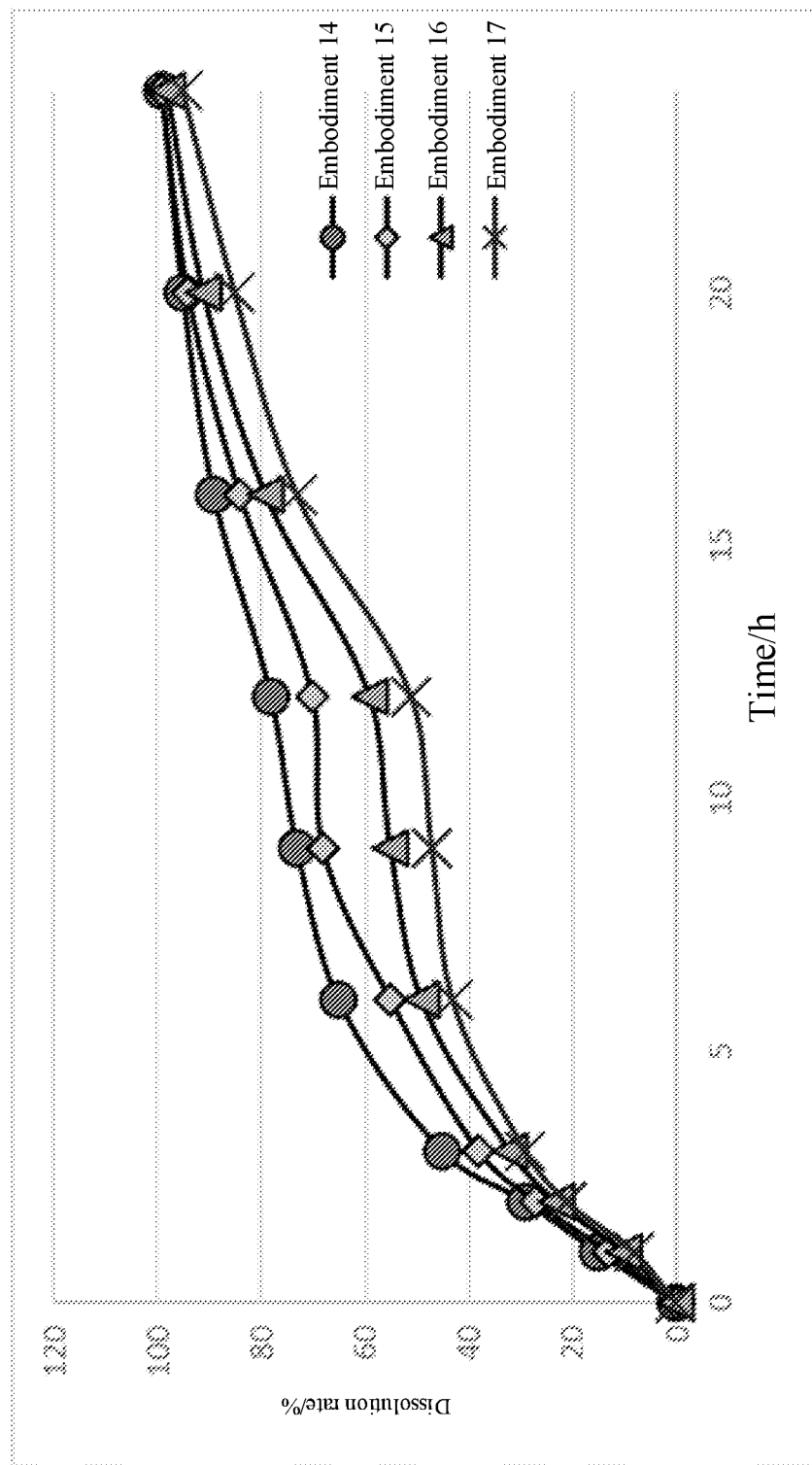
FIG. 2 shows dissolution curves of Embodiment 14 to 17.

Dissolution situations of the tablets prepared in Embodiments 14 to 17 were shown in Table 7 below, and the dissolution curves were shown in FIG. 2.

TABLE 7

| Time/hour | Dissolution rate (%) | | | | | | | | | |
|---|---|---|---|---|---|---|---|---|---|---|
|  | 0 | 1 | 2 | 3 | 6 | 9 | 12 | 16 | 20 | 24 |
| Embodiment 14 | 0 | 15 | 29 | 45 | 65 | 73 | 78 | 89 | 95 | 99 |
| Embodiment 15 | 0 | 13 | 27 | 38 | 55 | 68 | 70 | 84 | 94 | 99 |
| Embodiment 16 | 0 | 10 | 23 | 32 | 49 | 55 | 59 | 79 | 91 | 98 |
| Embodiment 17 | 0 | 8 | 21 | 29 | 43 | 47 | 51 | 73 | 85 | 95 |

Embodiment 18

The formula and dose ratio used in Embodiment 18 were shown in Table 8 below, wherein d90 in particle size distribution of apixaban was 4.3 microns, and the total weight of blended granules was 500 g.

TABLE 8

Embodiment 18

|  |  | Material | Parts by weight | Percentage of total tablet weight |
|---|---|---|---|---|
| Sustained-release granule part | API | Apixaban | 10 | 2.73% |
|  | Enteric material | Eudragit FS 30 D* | 32 | 8.74% |
|  | Anti-sticking agent | Talcum powder | 6 | 1.64% |
|  | Surfactant | Sodium dodecyl sulfate | 6 | 1.64% |
|  | Plasticizer | Triethyl citrate | 2 | 0.55% |
|  | Solvent | Purified water ** | Appropriate | — |
| Gel skeleton part | Strong liquid sorbent | Microcrystalline cellulose | 100 | 27.32% |
|  | Hydrophilic gel material | Hydroxypropyl methylcellulose K4M | 40 | 10.93% |
|  | Hydrophilic gel material | Polyvinyl alcohol 17-88 | 40 | 10.93% |
|  | Filler | Pregelatinized starch | 120 | 32.79% |
|  | Solvent | Purified water | Appropriate | — |
|  | Glidant | Aerosil | 5 | 1.37% |
|  | Lubricant | Magnesium stearate | 5 | 1.37% |
|  | Tablet weight mg |  | 366 |  |
|  | Content uniformity A + 2.2 S |  | 6.8 |  |

* Based on the weight of solid matters in Utrecht aqueous dispersion.
** The dose of the purified water comprised the amount of water in Utrecht aqueous dispersion and the added amount of water. The purified water was dried and removed during processing. In the prescription, other components except the strong liquid sorbent and the adhesive were mixed with the solvent to prepare the suspension, and the dose of the solvent used was about 30 of the solid contents in the suspension.

Preparation process steps of Embodiment 18:

1) adding an anti-sticking agent, a plasticizer, a surfactant and an API into a certain amount of solvent hot water (70° C. to 80° C.), homogenizing the mixture for 10 minutes with a high-shear homogenizer to obtain a suspension with a solid content about 30%, and continuously stirring the suspension for later use;

2) slowly pouring the suspension in the step 1) into an enteric material Utrecht FS 30D, stirring with a common stirrer at a medium speed at the same time, and then filtering the suspension with a 40-mesh sieve for later use;

3) adding an adhesive and a strong liquid sorbent into an EMG2-6 high-shear granulator for pre-mixing for 5 minutes, after uniformly mixing the mixture, spraying the suspension obtained in step 2) into the granulator within 1-3 minutes, and continuing stirring for 2 minutes to obtain a soft material with an appropriate wetting degree;
4) wet-grading the soft material in step 3) with a 40-mesh swing granulator;
5) drying the material obtained in the step 4), and dry-grading the obtained dried granules by using a sieve with a pore diameter of 15 meshes to obtain sustained-release granules;
6) preparing a gel skeleton part by a high-shear granulating process; adding a hydrophilic gel material and a filler into the high-shear granulator and uniformly mixing, spraying solvent purified water into the material in the granulator, and continuously stirring the mixture to obtain a soft material with an appropriate wetting degree;
7) wet-grading the soft material in step 2) with a rotary Comil pulverizer under an 8*8 mm square hole sieve;
8) drying the material obtained in the step 3), and dry-grading the obtained dried granules by using a sieve with a pore diameter of 20 meshes to obtain gel skeleton granules;
9) mixing the sustained-release granules, the gel skeleton granules and a lubricant in a mixing barrel for 20 minutes to obtain blended granules; and
10) tableting the blended granules with a high-speed rotary tablet press, and selecting a Φ10 mm round die, each tablet containing 10 mg of apixaban, to obtain apixaban sustained-release tablets.

In Embodiment 18, an acid dissolution rate of a certain amount of the sustained-release granules (containing about 10 mg of apixaban) was 60%. A dissolution situation of the prepared tablets was shown in Table 11 below, and a dissolution curve was shown in FIG. 3.

Embodiment 19

The formula and dose ratio used in Embodiment 19 were shown in Table 9 below, wherein d90 in particle size distribution of lenalidomide was 7.5 microns, and the total weight of blended granules was 500 g.

TABLE 9

Embodiment 19

| | | Material | Parts by weight | Percentage of total tablet weight |
|---|---|---|---|---|
| Sustained-release granule part | API | Lenalidomide | 20 | 3.45% |
| | Enteric material | Eudragit S100 | 60 | 10.34% |
| | Anti-sticking agent | Talcum powder | 5 | 0.86% |
| | Plasticizer | Triethyl citrate | 10 | 1.72% |
| | Solvent | Ethanol* | 500 | — |
| | Strong liquid sorbent | Microcrystalline cellulose | 200 | 34.48% |
| Gel skeleton part | Hydrophilic gel material | Sodium alginate | 130 | 22.41% |
| | Filler | Pregelatinized starch | 150 | 25.86% |
| | Solvent | Purified water* | Appropriate | — |
| | Lubricant | Magnesium stearate | 5 | 0.86% |
| | | Tablet core weight mg | 580 | |

TABLE 9-continued

Embodiment 19

| | | Material | Parts by weight | Percentage of total tablet weight |
|---|---|---|---|---|
| Gastric coating | Coating material | Opadry 85F18422 | weight increment of 3% of tablet core weight | |
| | | Content uniformity A + 2.2 S | 7.2 | |

The solvent was dried and removed during processing.
Preparation process steps of Embodiment 19:
1) referring to Embodiment 1 for the preparation process of sustained-release granule part;
2 preparing a gel skeleton part by a fluidized bed granulating process: adding a hydrophilic gel material and a filler into a granulating fluidized bed, mixing for 10 minutes, spraying solvent purified water into the materials in a granulator, controlling a temperature of the materials at about 40° C. and an air volume at 1,103 m/h for granulation, and drying for 30 minutes after spraying to obtain dried granules;
3) dry-grading the dried granules obtained in step 2) by a sieve with a pore diameter of 20 meshes to obtain gel skeleton granules.
4) mixing the sustained-release granules, the gel skeleton granules and a lubricant in a mixing barrel for 20 minutes to obtain blended granules; and
5) tableting the blended granules by a high-speed rotary tablet press, selecting a Φ12 mm round die, and tableting according to the target tablet weight to obtain lenalidomide sustained-release tablets; and
6) dispersing a gastric coating material in purified water to obtain a suspension with a solid content of 10%, placing uncoated tablets in a high-efficiency porous coating machine, spraying a suspension for coating, and coating according to a weight increase of 3% of a tablet core weight to obtain lenalidomide sustained-release tablets.

Figure 3:
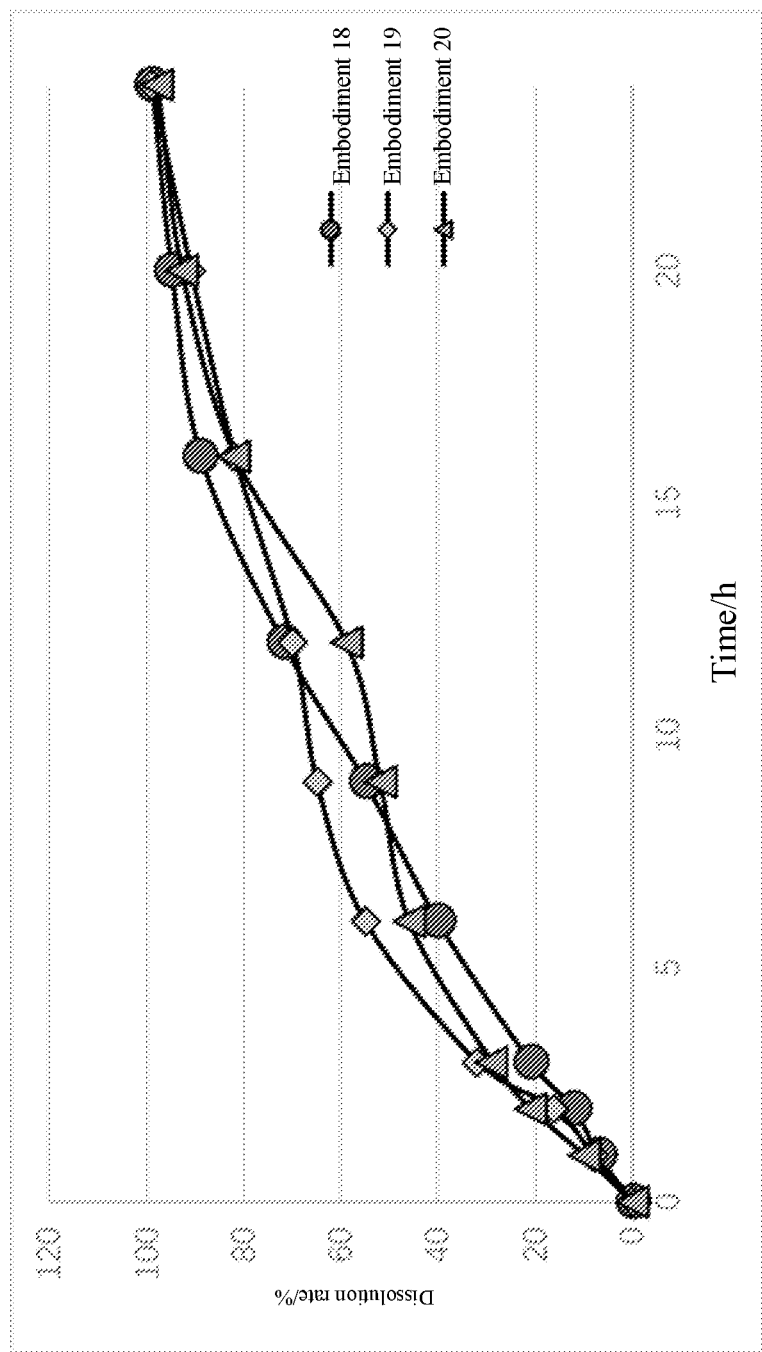
FIG. 3 shows dissolution curves of Embodiments 18 to 20.

An acid dissolution rate of the sustained-release granules in Embodiment 19 was 68%, a dissolution rate of the prepared tablets was shown in Table 11 below, and a dissolution curve was shown in FIG. 3.

Embodiment 20

The formula and dose ratio used in Embodiment 20 were shown in Table 10 below, wherein d90 in particle size distribution of lenalidomide was 10 microns, and the total weight of blended granules was 500 g.

TABLE 10

Embodiment 20

| | | Material | Parts by weight | Percentage of total tablet weight |
|---|---|---|---|---|
| Sustained-release granule part | API | Tofacitinib | 22 | 4.07% |
| | Enteric material | Eudragit FS 30 D* | 44 | 8.15% |
| | Anti-sticking agent | Talcum powder | 10 | 1.85% |

TABLE 10-continued

Embodiment 20

| | Material | | Parts by weight | Percentage of total tablet weight |
|---|---|---|---|---|
| | Plasticizer | Triethyl citrate | 4 | 0.74% |
| | Solvent | Purified water ** | Appropriate | — |
| Gel skeleton part | Strong liquid sorbent | Microcrystalline cellulose | 100 | 18.52% |
| | Hydrophilic gel material | Carbomer 980 | 80 | 14.81% |
| | Hydrophilic gel material | Hydroxypropyl cellulose HF | 80 | 14.81% |
| | Filler | Pregelatinized starch | 150 | 27.78% |
| | Solvent | Purified water | Appropriate | — |
| | Lubricant | Magnesium stearate | 5 | 0.93% |
| | | Tablet weight mg | 565 | |
| | | Content uniformity A + 2.2 S | 6.1 | |

*Based on the weight of solid matters in Utrecht aqueous dispersion.
** The dose of the purified water comprised the amount of water in Utrecht aqueous dispersion and the added amount of water. The purified water was dried and removed during processing. In the prescription, other components except the strong liquid sorbent and the adhesive were mixed with the solvent to prepare the suspension, and the dose of the solvent used was about 20%-25% of the solid contents in the suspension.

Preparation process steps of Embodiment 20:
1) referring to Embodiment 1 for the preparation process of sustained-release granule part;
2) preparing a gel skeleton part by a high-shear granulating process; adding sustained-release granules, a hydrophilic gel material and a filler into a high-shear granulator, after uniformly mixing, spraying solvent purify water into the material in the granulator, granulating, spraying solvent purified water into the materials in the granulator, and continuously stirring the mixture to obtain a soft material with an appropriate wetting degree;
3) wet-grading the soft material in step 2) with a rotary Comil pulverizer under an 8*8 mm square hole sieve;
4) drying the material obtained in the step 3), and dry-grading the obtained dried granules by using a sieve with a pore diameter of 20 meshes to obtain graded granules;
5) mixing the graded granules obtained in the step 4) and a lubricant in a mixing barrel for 20 minutes to obtain blended granules; and
6) tableting the blended granules by a high-speed rotary tablet press, selecting a Φ11 mm round die, and tableting according to the target tablet weight to obtain tofacitinib sustained-release tablets.

In Embodiment 20, an acid dissolution rate of a certain amount of the sustained-release granules (containing about 22 mg of tofacitinib) was 66%. A dissolution situation of the prepared tablets was shown in Table 11 below, and a dissolution curve was shown in FIG. 3.

TABLE 11

| | Dissolution rate (%) | | | | | | | | |
|---|---|---|---|---|---|---|---|---|---|
| Time/hour | 0 | 1 | 2 | 3 | 6 | 9 | 12 | 16 | 20 | 24 |
| Embodiment 18 | 0 | 7 | 12 | 21 | 40 | 55 | 72 | 89 | 95 | 99 |
| Embodiment 19 | 0 | 8 | 16 | 32 | 55 | 65 | 70 | 82 | 91 | 99 |
| Embodiment 20 | 0 | 10 | 21 | 29 | 46 | 52 | 59 | 82 | 93 | 98 |

Comparative Example 1

To distinguish the difference between the present invention and the disclosed technology, the inventor referred to the preparation process of a solid dispersion disclosed in CN1204895, and adopted the similar prescription of sustained-release granules in Embodiment 1 of the present invention to prepare samples for comparison.
(1) A solid dispersion of apremilast was prepared with reference to the method in CN1204895, wherein 10 g of apremilast and 20 g of Eudragit S100 powder were dissolved in ethanol needing to be more than 15 L first; according to the prescription of Embodiment 1 in the present invention, the ethanol used to prepare the same 10 g of apremilast sample was less than 1 L, which significantly reduced the dose of the organic solvent.
(2) Because a preparation method of a skeleton tablet solid dispersion in CN1204895 was not fully disclosed, it was found that the solid substance was not completely dried by evaporating the solvent in an oven at 60° C. for 48 hours in a beaker containing 200 ml of solution A by the common drying method, and it would take a lot of time to continue drying. In Embodiment 1 of the present invention, the common fluidized bed granulator was used to spray the suspension onto the strong liquid sorbent quickly to complete the granulation operation, which could control the time within 60 minutes, and had a good drying effect.

Therefore, compared with the method recorded in CN1204895, the present invention can significantly reduce the dose of the organic solvent, shorten the drying time, save energy, protect the environment and have high efficiency.

Comparative Example 2

In Comparative Example 2, samples were prepared with reference to the similar prescription of the sustained-release granules in Embodiment 5 of the present invention, except that lactose with poor liquid adsorption capacity was used to replace the strong liquid sorbent microcrystalline cellulose, and the obtained sustained-release granules were prepared into tablets by the prescription process in Embodiment 14.

During the experiment, it was found that particle sizes of the sustained-release granules were different, and stratification was easy to occur. The samples were tested, and an acid dissolution rate of the sustained-release granules of Comparative Example 2 was 91%, which exceeded the upper limit of the control target by 80%. Content uniformity (A+2.2S) of the tablets was 16.2, exceeding a qualified limit of 15; and the dissolution rate of the tablets was obviously too fast, as shown in Table 12 below.

TABLE 12

| | Dissolution rate (%) | | | | | | | | |
|---|---|---|---|---|---|---|---|---|---|
| Time/hour | 0 | 1 | 2 | 3 | 6 | 9 | 12 | 16 | 20 | 24 |
| Comparative Example 2 | 0 | 21 | 35 | 49 | 67 | 82 | 92 | 95 | 97 | 97 |

Comparative Examples 3 to 4

In Comparative Example 3 and Comparative Example 4, tablets were prepared with reference to the sustained-release granule prescription in Embodiment 6 and the prescription in Embodiment 15 of the present invention, wherein in the sustained-release granule prescription in Comparative Example 3, the tablets of Comparative Example 3 were obtained by mixing the sustained-release granule powder with hydroxypropyl methylcellulose K15M PH DC, lactose and magnesium stearate without separate granulation. When granulating the sustained-release granules according to the prescription of Comparative Example 4, bulk drugs were mixed with polyvidone K30 and sodium carboxymethyl starch, and an enteric-coated material, an anti-sticking agent, a plasticizer and a surfactant were separately prepared into a suspension. The subsequent spray-granulation and tableting process was carried out according to Embodiment 15 to obtain tablets of Comparative Example 4.

The samples were detected, and content uniformity (A+2.2S) 2S of the tablets of
Comparative Example 3 and Comparative Example 4 were 17.2 and 18.3 respectively, exceeding the qualified limit of 15; a dissolution rate of the tablets of Comparative Example 3 was also obviously too fast, and final dissolution of Comparative Example 4 was incomplete. A specific dissolution rate was shown in Table 13 below.

TABLE 13

| | Dissolution rate (%) | | | | | | | | | |
|---|---|---|---|---|---|---|---|---|---|---|
| Time/hour | 0 | 1 | 2 | 3 | 6 | 9 | 12 | 16 | 20 | 24 |
| Comparative Example 3 | 0 | 22 | 35 | 45 | 64 | 76 | 85 | 91 | 92 | 95 |
| Comparative Example 4 | 0 | 19 | 32 | 41 | 55 | 64 | 68 | 74 | 76 | 79 |

Compared with Comparative Example 3 and Comparative Example 4, Embodiment 15 adopting the content of the present invention effectively ensures that the content uniformity of the tablets is within an acceptable range, and the tablet dissolution is slow and lasting, and the final dissolution is complete (the dissolution rate is more than 80% in 20 hours).

In conclusion, according to the oral sustained-release composition of the insoluble drug disclosed by the present invention, the suspension of bulk drugs was prepared into the sustained-release granules with quick release, sustained release and controlled release by spraying the suspension with the enteric material having high pH sensitivity, and then further sustained-released by the hydrophilic gel material to form multiple sustained-release to the drug; meanwhile, the full dissolution of the insoluble drug can be effectively ensured, and the phenomenon of incomplete dissolution in the insoluble drug can be avoided through the dispersion and controlled release of the enteric material. The samples prepared according to the present invention have good content uniformity, long dissolution and release time, simple process and strong practicability.

What is claimed is:

1. An oral sustained-release composition for an insoluble drug, wherein the oral sustained-release composition comprises a sustained-release granule part and a gel skeleton part, the sustained-release granule part comprises the insoluble drug, an enteric material that is a polymer material soluble in a pH range of 6-8, and a strong liquid sorbent; the polymer material is a copolymer of methacrylic acid and methyl methacrylate, or a copolymer of methacrylic acid, methyl acrylate, and methyl methacrylate; the gel skeleton part comprises a hydrophilic gel skeleton material that is selected from the group consisting of arabic gum, tragacanth gum, polyvinyl pyrrolidone, hydroxypropyl methyl cellulose, shellac, hydroxypropyl cellulose, hydroxyethyl cellulose, alginate, methylated cellulose, carrageenin, carboxymethyl cellulose, and sodium carboxymethylcellulose, carbomer, and polyvinyl alcohol; and the sustained-release granules are obtained by preparing the insoluble drug and a liquid substance containing the enteric material into a suspension and then spraying the suspension onto the strong liquid sorbent that is selected from the group consisting of microcrystalline cellulose, croscarmellose sodium, croscarmellose, polyvinylpolypyrrolidone, sodium carboxymethyl starch, low substituted hydroxypropyl cellulose, starch and pregelatinized starch; wherein the insoluble drug in the sustained-release granules accounts for 2%-15% of the sustained-release granules by weight, a ratio of the insoluble drug to the enteric material is 1:2 to 1:4 by weight, and the strong liquid sorbent accounts for 35%-75% of the sustained-release granules by weight; the sustained-release granules account for 40%-70% of the oral sustained-release composition by weight; and an amount of the hydrophilic gel skeleton material account for 20%-50% of the oral sustained-release composition by weight; wherein the portion of the insoluble drug without coated by the enteric material in the sustained-release granules is released immediately, the portion of the insoluble drug coated by the enteric material in the sustained-release granules is specifically released in colon, and the portion of the insoluble drug mixed with the hydrophilic gel skeleton material in the sustained-release granules is prolong released.

2. The oral sustained-release composition according to claim 1, wherein the oral sustained-release composition contains less than 10% of the insoluble drug by weight.

3. The oral sustained-release composition according to claim 1, wherein d90 in particle size distribution of the insoluble drug is controlled to be less than 20 microns.

4. The oral sustained-release composition according to claim 1, wherein the insoluble drug is coated by the enteric material, and the insoluble drug is capable of being completely released in a position of colon.

5. The oral sustained-release composition according to claim 1, wherein the liquid substance containing the enteric material is in an aqueous dispersion form or an organic solvent solution form of the enteric material, wherein the aqueous dispersion form of the enteric material is obtained by adding water and/or water containing an alkaline substance to the enteric material, and the organic solvent solution of the enteric material is obtained by dissolving the enteric material with an organic solvent.

6. The oral sustained-release composition according to claim 1, wherein a solid content of the drug-containing suspension is 10-35%.

7. The oral sustained-release composition according to claim 1, wherein the sustained-release granules are added with an adhesive, the adhesive comprises any one or more of polyvinylpyrrolidone, hydroxypropyl methylcellulose, hydroxypropyl cellulose, carboxymethyl cellulose, carrageenan, alginic acid, arabic gum, pectin, xanthan gum and tragacanth, and the sustained-release granules contain 0-5% the adhesive by weight.

8. The oral sustained-release composition according to claim 1, wherein the liquid substance containing the enteric material is added with any one or a combination of several of 0-8% of anti-sticking agent, 0-8% of plasticizer and 0-3% of surfactant by weight of the sustained-release granules before use, wherein the anti-sticking agent is selected from colloidal silicon dioxide, talcum powder, and glyceryl monostearate; the plasticizer is selected from glyceryl monostearate, triethyl citrate, and polyethylene glycol; and the surfactant is selected from sorbitan fatty acid, polysorbate, and sodium dodecyl sulfate.

9. The oral sustained-release composition according to claim 1, wherein the gel skeleton part is added with a filler, an adhesive, a lubricant, and a glidant.

10. A preparation method of the oral sustained-release composition according to claim 1, comprising the following steps:
(i) dispersing the insoluble drug into a liquid solution containing an enteric material to obtain a suspension, and then spraying the obtained suspension onto a strong liquid sorbent for granulation to form sustained-release granules; and
(ii) mixing the sustained-release granules obtained in step (i) with a material containing a hydrophilic gel skeleton material, and tableting, wherein the sustained-release granules are added into components of the gel skeleton part for granulation together, or the gel skeleton part is granulated separately, then mixed with the prepared sustained-release granules, and tableted.

* * * * *